United States Patent
Masselin et al.

(10) Patent No.: US 11,426,322 B2
(45) Date of Patent: Aug. 30, 2022

(54) METHOD FOR MOVING AN EXOSKELETON

(71) Applicant: WANDERCRAFT, Paris (FR)

(72) Inventors: Matthieu Masselin, Orsay (FR); Kien Cuong Nguyen, Orsay (FR)

(73) Assignee: WANDERCRAFT, Paris (FR)

( * ) Notice: Subject to any disclaimer, the term of this patent is extended or adjusted under 35 U.S.C. 154(b) by 618 days.

(21) Appl. No.: 16/476,813

(22) PCT Filed: Jan. 10, 2018

(86) PCT No.: PCT/FR2018/050057
§ 371 (c)(1),
(2) Date: Jul. 9, 2019

(87) PCT Pub. No.: WO2018/130784
PCT Pub. Date: Jul. 19, 2018

(65) Prior Publication Data
US 2019/0358113 A1   Nov. 28, 2019

(30) Foreign Application Priority Data

Jan. 10, 2017 (FR) ........................... 1750217

(51) Int. Cl.
*G05B 19/04*   (2006.01)
*A61H 3/00*   (2006.01)
(Continued)

(52) U.S. Cl.
CPC .............. *A61H 3/00* (2013.01); *B25J 9/0006* (2013.01); *B25J 9/1679* (2013.01);
(Continued)

(58) Field of Classification Search
CPC .............................. B25J 9/0006; B25J 9/1679
See application file for complete search history.

(56) References Cited

U.S. PATENT DOCUMENTS

| 7,153,242 | B2 * | 12/2006 | Goffer | .................. | A61F 5/0102 |
| | | | | | 482/66 |
| 2003/0093021 | A1 * | 5/2003 | Goffer | .................. | B25J 9/0006 |
| | | | | | 602/23 |

(Continued)

FOREIGN PATENT DOCUMENTS

| EP | 2231096 A2 | 9/2010 |
| FR | 3034659 A1 | 10/2016 |

(Continued)

OTHER PUBLICATIONS

Agrawal et al., "First Steps Towards Translating HZD Control of Bipedal Robots to Decentralized Control of Exoskeletons", IEEE Access, 2016, 16 pages.

(Continued)

*Primary Examiner* — Harry Y Oh
(74) *Attorney, Agent, or Firm* — Womble Bond Dickinson (US) LLP (57) ABSTRACT

The present invention relates to a method for moving an exoskeleton (1) receiving a human operator, said exoskeleton (1) having a plurality of degrees of freedom including at least one degree of freedom actuated and at least one non-actuated degree of freedom, the method being characterised in that it comprises the implementation of steps of:
(a) when a start request is received, generating and emitting a command to at least one of said actuators so as to put the exoskeleton (1) in a tipping state;
(b) in a database stored in data storage means (12) of triplets of:
a set of virtual requirements on said actuated degrees of freedom,
a controller for said exoskeleton (1) capable of generating commands of said actuators so as to fulfil said virtual requirements by implementing at least one attracting stable trajectory, (Continued)

a stability pool formed by all the points from which the execution of said controller allows a convergence to said attracting stable trajectory;

identifying a set of virtual requirements such that said tipping state is included in said stability pool associated with this set of virtual requirements;

(c) executing the controller associated with the set of virtual requirements identified such that the exoskeleton (1) walks.

9 Claims, 4 Drawing Sheets

(51) Int. Cl.
- *B25J 9/00* (2006.01)
- *B62D 57/032* (2006.01)
- *B25J 9/16* (2006.01)

(52) U.S. Cl.
CPC ...... *B62D 57/032* (2013.01); *A61H 2003/007* (2013.01); *A61H 2201/165* (2013.01)

(56) References Cited

U.S. PATENT DOCUMENTS

| | | | |
|---|---|---|---|
| 2011/0205067 A1* | 8/2011 | Konishi | A61H 1/024 340/573.1 |
| 2013/0197408 A1* | 8/2013 | Goldfarb | A61H 1/024 601/35 |
| 2015/0142130 A1* | 5/2015 | Goldfarb | A61H 1/0244 623/25 |
| 2015/0190249 A1* | 7/2015 | Ishibashi | A61F 5/01 623/24 |
| 2016/0038371 A1* | 2/2016 | Sandler | A61H 3/02 602/19 |
| 2019/0105215 A1* | 4/2019 | Dalley | A61H 3/00 |

FOREIGN PATENT DOCUMENTS

| | | |
|---|---|---|
| WO | 2009/082249 A2 | 7/2009 |
| WO | 2015/140352 A1 | 9/2015 |
| WO | 2015/140353 A2 | 9/2015 |

OTHER PUBLICATIONS

International Preliminary Report on Patentability received for PCT Patent Application No. PCT/FR2018/050057, dated Jul. 25, 2019, 18 pages (9 pages of English Translation and 9 pages of Original Document).

International Search Report and Written Opinion received for PCT Patent Application No. PCT/FR2018/050057, dated Apr. 11, 2018, 22 pages (10 pages of English Translation and 12 pages of Original Document).

Kajita et al., "Biped Walking pattern generation by using preview control of Zero-Moment Point", Proceedings of the 2003 IEEE International Conference on Robotics & Automation, 2003, pp. 1620-1626.

Manchester et al., "Real-time planning with primitives for dynamic walking over uneven terrain", 2014 IEEE International Conference on Robotics and Automation (ICRA), IEEE, 2014, pp. 4639-4646.

Preliminary Research Report and Written Opinion received for French Application No. 1750217, dated May 30, 2017, 11 pages (1 page of French Translation Cover Sheet and 10 pages of original document).

Ugurlu et al., "Lower body exoskeleton-supported compliant bipedal walking for paraplegics: How to reduce upper body effort?", 2014 IEEE International Conference on Robotics and Automation (ICRA), IEEE, 2014, pp. 1354-1360.

* cited by examiner

METHOD FOR MOVING AN EXOSKELETON

GENERAL TECHNICAL FIELD

The present invention relates to the field of exoskeleton type robots.

More precisely, it relates to a method for moving an exoskeleton.

STATE OF THE ART

Recently, for people with important mobility problems such as paraplegic people, assisted walking devices called exoskeletons appeared, which are external robotic devices that the operator (the human user) will "put on" thanks to a fastener system which links the exoskeleton movements to his/her own movements. The exoskeletons of lower limbs have several joints, generally at the knees and hips, to reproduce the walking movement. Actuators enable these joints to be moved, which in turn will move the operator. An interface system enables the operator to give orders to the exoskeleton, and a control system transforms these orders into commands for the actuators. Sensors will generally complete the device.

These exoskeletons are a progress relative to the wheelchairs, because they enable the operators to stand up again and walk. The exoskeletons are no longer limited by the wheels and can theoretically work in most of non-flat environments: the wheels, unlike the legs, do not make it possible to cross important obstacles as steps, stairs, obstacles with too high a height, etc.

However, in their use, none of these exoskeletons makes an autonomous i.e. stable and viable human walk, over a wide anthropomorphous, non-assisted variety of terrains.

In most cases, these limitations appear in the impossibility for the device to manage balance or the walking direction on its own. Both these tasks are thereby generally transferred to the operator, who makes them thanks to crutches, as proposed for example in Rewalk U.S. Pat. No. 7,153,242, or in Ekso-Bionics application US2016038371.

Rex-Bionics Patent EP2231096 describes the only exoskeleton usable without external help by a person incapable of ensuring his/her own stability. The control principle, describes in paragraph [0122], clearly explains the need for transferring the centre of pressure (the physical point corresponding to the resultant of the reaction forces exerted by the ground on the system) of a part of the support polygon (the convex envelop of the points of contact with the ground) to another part of the support polygon.

This limitation imposes an extremely slow walk (a few meters per minute) with short steps (less than 30 cm), during which the pressing foot is constantly in planar contact with the ground. The type of accessible environment is thus limited, since uneven terrains are excluded as a matter of fact. Likewise, the slightest obstacle as a pebble, a small object, generates a risk of putting the system off balance if he/she places his/her foot thereon at a given instant, and ultimately to make him/her fall down.

Consequently, it would be desirable to have a new walking paradigm for exoskeletons which is dispensed with the current requirements, so as to provide a quick natural walk without the risk of falling or losing balance even in case of hard and unexpected terrain.

DISCLOSURE OF THE INVENTION

The present invention thus relates according to a first aspect to a method for moving an exoskeleton receiving a human operator, said exoskeleton having a plurality of degrees of freedom including at least one degree of freedom actuated by an actuator controlled by data processing means and at least one non-actuated degree of freedom, the method being characterised in that it comprises the implementation by the data processing means of steps of:

(a) when a start request is received, generating and emitting a command to at least one of said actuators so as to put the exoskeleton in a tipping state;

(b) in a database stored in data storage means of triplets of:
  a set of virtual requirements on said actuated degrees of freedom, the virtual requirements being parameterised by a phase variable,
  a controller for said exoskeleton capable of generating commands of said actuators so as to fulfil the virtual requirements by implementing at least one attracting stable trajectory in a topological variety formed by all the n-tuples of the possible values for said non-actuated degrees of freedom and the phase variable,
  a stability pool formed by all the points of a hyperplane of said variety for a given value of the phase parameter, from which the execution of said controller allows a convergence to said attracting stable trajectory;

identifying a set of virtual requirements such that said tipping state is included in said stability pool associated with this set of virtual requirements;

(c) executing the controller associated with the set of virtual requirements identified such that the exoskeleton walks.

According to other advantageous and non-limiting characteristics:

step (a) comprises determining a walking speed and/or direction set point as a function of which said command to at least one of said actuators is generated, step (c) comprising checking that said speed and/or direction set point is fulfilled by the current walk in said database;

the method comprises, if said speed and/or direction set point is not fulfilled by the current walk, a step (d) of identifying in said database a new set of virtual requirements such that the current state of the exoskeleton is included in said stability pool associated with this set of virtual requirements; and repeating step (c);

said walking speed and/or direction set point is determined as a function of a posture of said human operator;

the operator's chest is equipped with a plurality of posture sensors, said walking speed and/or direction set point being determined as a function of the posture of said operator's chest measured by the plurality of sensors;

the tipping state is a state in which a Zero Moment Point, ZMP, is not inside a lift surface for the exoskeleton;

step (c) comprises stopping the exoskeleton if no acceptable set of virtual requirements is identified.

According to a second aspect, the invention relates to an exoskeleton comprising data processing means and having a plurality of degrees of freedom including at least one degree of freedom actuated by an actuator controlled by the data processing means and at least one non-actuated degree of freedom, characterised in that it comprises data storage means storing a database of triplets of:
  a set of virtual requirements on said actuated degrees of freedom, the virtual requirements being parameterised by a phase variable,
  a controller for said exoskeleton capable of generating commands for said actuators so as to fulfil said virtual requirements by implementing at least one attracting stable trajectory in a topological variety formed by all the n-tuples of the possible values of said non-actuated degrees of freedom and the phase variable, a stability pool formed by all the points of a hyperplane of said variety by a given value of the phase parameter, from which the execution of said controller allows a convergence to said attracting stable trajectory;

and in that the data processing means are configured to implement:

a module for generating and emitting a command to at least one of said actuators so as to put the exoskeleton in a tipping state when a start request is received;

a module for identifying in said database storage means a set of virtual requirements such that said tipping state is included in said stability pool associated with this set of virtual requirements;

an execution module of the controller associated with the set of virtual requirements identified such that the exoskeleton walks.

According to a third and a fourth aspect, the invention relates to a computer program product comprising code instructions for the execution of a method for moving an exoskeleton according to the first aspect of the invention; and a computing equipment-readable storage means on which a computer program product comprises code instructions for the execution of a method for moving an exoskeleton according to the first aspect of the invention.

DESCRIPTION OF THE FIGURES

Further characteristics and advantages of the present invention will appear upon reading the description that follows of a preferential embodiment. This description will be given in reference to the appended drawings in which.

DETAILED DESCRIPTION

Walking with Feet Flat on the Ground

"Natural" human walking is characterised by a succession of phases during which the feet can be flat on the ground, in the air, or rolling on the ground. This ability to unroll the foot is essential for walking because it makes it possible to make larger steps and allows a stability on a wider variety of terrains.

But the so-called first generation exoskeletons described recently have no actuated foot or keep the pressing foot on the ground.

Making this unrolling is actually complex for biped of humanoid robots or robotic devices. When the centre of pressure reaches the limit of the support polygon, the system starts to roll about this point, and is thus no longer in static balance.

In the case of walking, the foot unrolling involves a loss of inertial contact with the ground at the pressing foot, with several consequences:

the support polygon (the lift surface) is reduced, potentially to one point, making it difficult or even impossible to maintain the centre of pressure inside the support polygon;

the system is under a underactuation situation, that is it can no longer act on all its degrees of freedom. All the movements are thereby no longer possible.

Under such a situation, the classic formalisms of walking feet flat on the ground as described in document Kajita S., K. F. (2003). Biped Walking pattern generation by using preview control of Zero-Moment Point ICRA, (pp. 1620-1626), or the principle described in the Rex-Bionics patent EP2231096 cannot operate any longer.

A natural idea is to bring the swinging leg forwardly and to put the second foot on the floor to get back to a support polygon and balance, whereas the system is in free rotation about the pressing foot, in some way "falling down". Thereby, this is called dynamic walking, since the body passes through a succession of instable postures, but only in a transient way (if the person "were stopped" in mid-flight, he/she would fall down).

In this approach of dynamic walking, bringing the foot quickly swinging in a position which restores at least briefly balance is complicated. Indeed, if this foot has to follow a pre-calculated time parameterised trajectory, this foot risks to hit the ground too early or too late due to the incontrollable behaviour of the underactuated system even subjected to slight disturbances (a trajectory which would slightly deviate from what has been planned cannot be corrected). This can generate discomfort to the operator, put him/her off balance or even make him/her falling down, including on simple terrains.

That is why all the first generation exoskeletons (and many humanoid robots) try to avoid this kind of situation by keeping the foot flat on the ground, with the consequence of the abovementioned limitations on the walking speed, step length, type of permissible terrain and general walking stability.

Architecture

Figure 1:
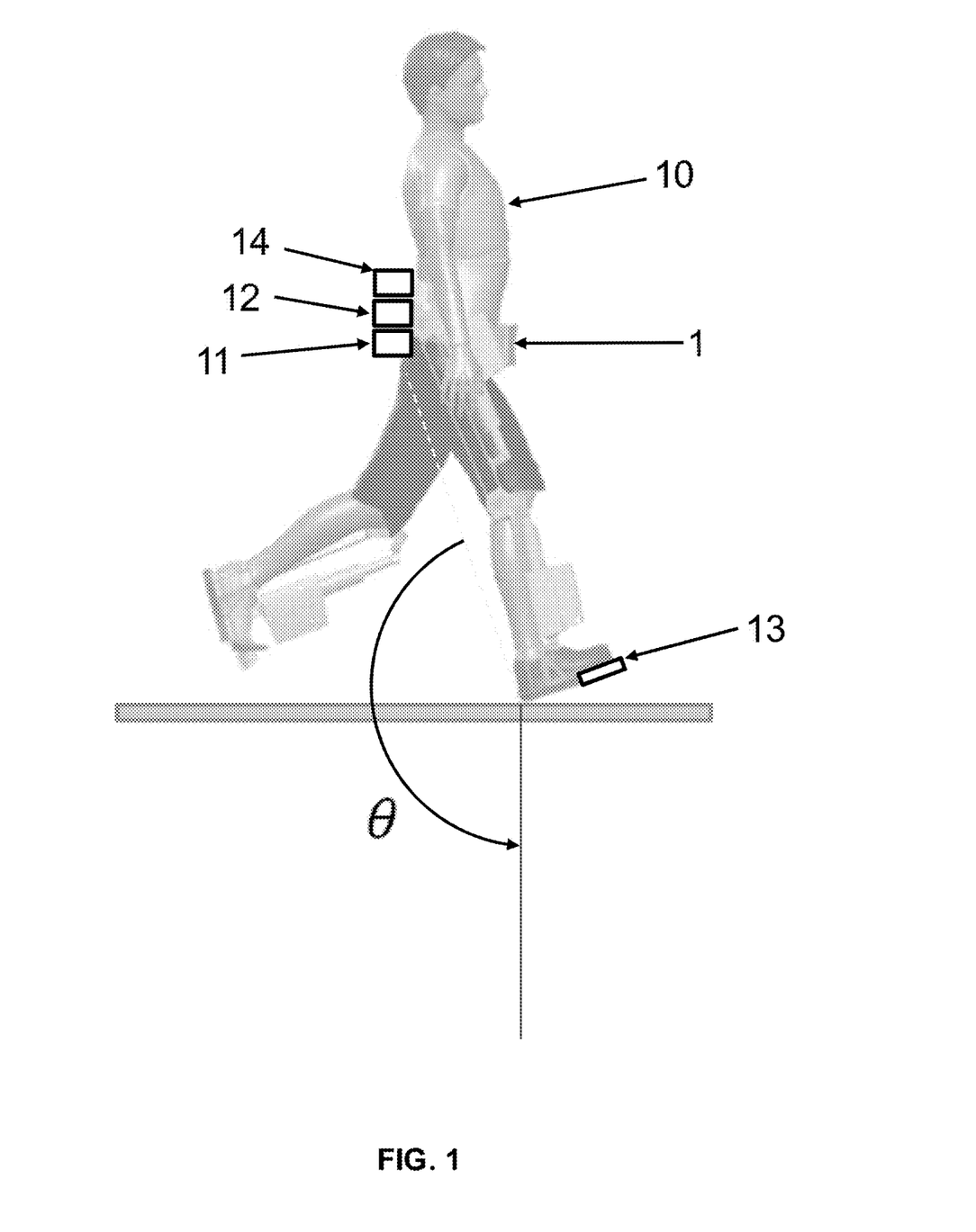
FIG. 1 is a scheme of an exoskeleton (of the exoskeleton type) for the implementation of the method according to the invention.

In reference to FIG. 1, the present method is a method of walking an exoskeleton 1, i.e. an articulated mechanical system of the actuated and controlled bipedal robotic device, provided with two legs, more precisely accommodating a human operator having his/her lower limbs each integral with a leg of the exoskeleton 1 (in particular thanks to straps). It can thus be a more or less humanoid robot. By "walking", it is meant here the movement of the robotic device 1, which in practice is reflected by alternate pressures on the legs, in the standing position, so as to produce a displacement.

The exoskeleton 1 has a plurality of degrees of freedom, that is of deformable joints (generally via a rotation) that is movable with respect to each other, each of which are either "actuated" or "non-actuated".

An actuated degree of freedom designates a joint provided with an actuator controlled by data processing means 11, that is the degree of freedom is controlled and it can be acted upon. On the contrary, a non-actuated degree of freedom designates a joint free of actuator, that is this degree of freedom follows its own dynamics and the data processing means 11 have no direct control thereon (but a priori an indirect control via the other actuated degrees of freedom). In the example of FIG. 1, the heel-ground contact is a point contact, and the exoskeleton 1 is thus rotationally free with respect to this point of contact. The angle between the heel-hip axis and the vertical is thereby a non-actuated degree of freedom.

The present exoskeleton naturally comprises at least one actuated degree of freedom, preferentially a plurality of them, and also at least one non-actuated degree of freedom, that is it is "underactuated", as previously discussed. By the underactuation degree, it is meant the number of non-actuated degrees of freedom.

The data processing means 11 designate a computing equipment (typically a processor, either external if the exoskeleton 1 is "remotely controlled" but preferentially onboard the exoskeleton 1) adapted to process instructions and generate commands to the different actuators. The later can be electric, hydraulic, etc.

The present application will not be limited to any architecture of exoskeleton 1, and the example as described in applications WO2015140352 and WO2015140353 will be taken.

Thus, preferably and in accordance with these applications, the exoskeleton 1 comprises on each leg, a foot structure comprising a support plane on which a foot of a leg of the person wearing the exoskeleton can press when the foot is flat.

The support plane comprises a front platform and a rear platform, such that a foot pivot pin connects the front platform to the rear platform, by making a non-actuated degree of freedom.

However, those skilled in the art will be able to adapt the present method to any other mechanical architecture.
Hybrid Zero Dynamics Traditionally, the trajectories/variations in each degree of freedom are expressed as a function of time. The "dynamics" of the system is defined by a function $f: \chi \times \mathcal{U} \times \mathbb{R}^+ \mapsto \chi$ and a starting point $\xi \in \chi$ the function f being written as $x^3_t = f(x_t, u_t, t), x_0 = \xi$, $\chi$ being the state space of the exoskeleton 1 and $\mathcal{U}$ the control space.

On the contrary, in the method of so-called "virtual requirements", the principle is to define for a selection of the actuated degrees of freedom, a trajectory parameterised by a parameter with a variation not in time, but as a direct function of the configuration, this parameter being called a phase variable. One example of a phase variable is represented in FIG. 1, it is the angle between the heel-hip axis and the vertical which thereby makes a non-actuated degree of freedom mentioned above.

The phase variable enables the "progress" of a step to be defined. More precisely, at each step, the phase variable continuously passes from an initial value to a final value, before the initial value is re-assigned thereto: it is the beginning of the next step. To make things easier, the value of the phase parameter can be normalised between 0 and 1.

Figure 2:
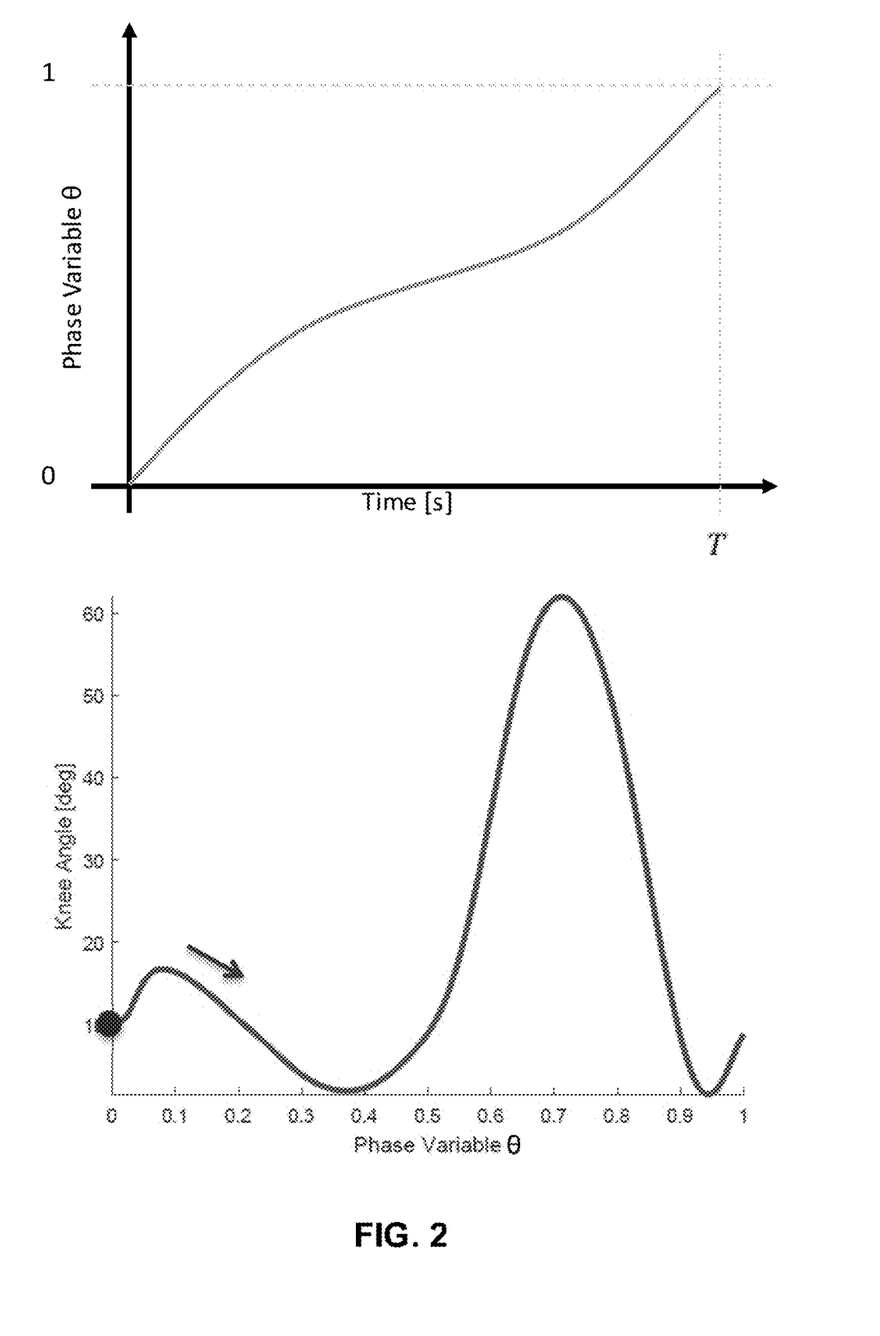
FIG. 2 represents an example of variation in a phase variable, and of variation in an actuated degree of freedom as a function of this phase variable.

A value of the actuated degrees of freedom that the system should be forced to follow corresponds to each value of the variation parameter: these relationships (one for each actuated degree of freedom desired to be controlled in this way) are called virtual requirements. FIG. 2 shows the operation of the virtual requirements for a joint, that of the knee.

If the system exactly follows this trajectory for the degrees of freedom on which it can be acted or desired to be acted, in other words if the virtual requirements are fulfilled for these degrees of freedom, then the variation of the system is fully determined by that of the non-actuated degrees of freedom which follow their own dynamics.

This dynamics is called the "Hybrid Zero Dynamics" (HZD), because:

it is said "Zero" because it corresponds to the degrees on which the command cannot/does not want to act, i.e. the command is 0;

it is called "Hybrid" because the foot impact on the ground imposes discontinuous instantaneous phases which interrupt the continuous phases.

This Hybrid Zero Dynamics depends on the chosen virtual requirements, and properly choosing the same can cause this dynamics to contain an attracting periodical "orbit", i.e. a trajectory to which the system is naturally attracted.

Figure 3:
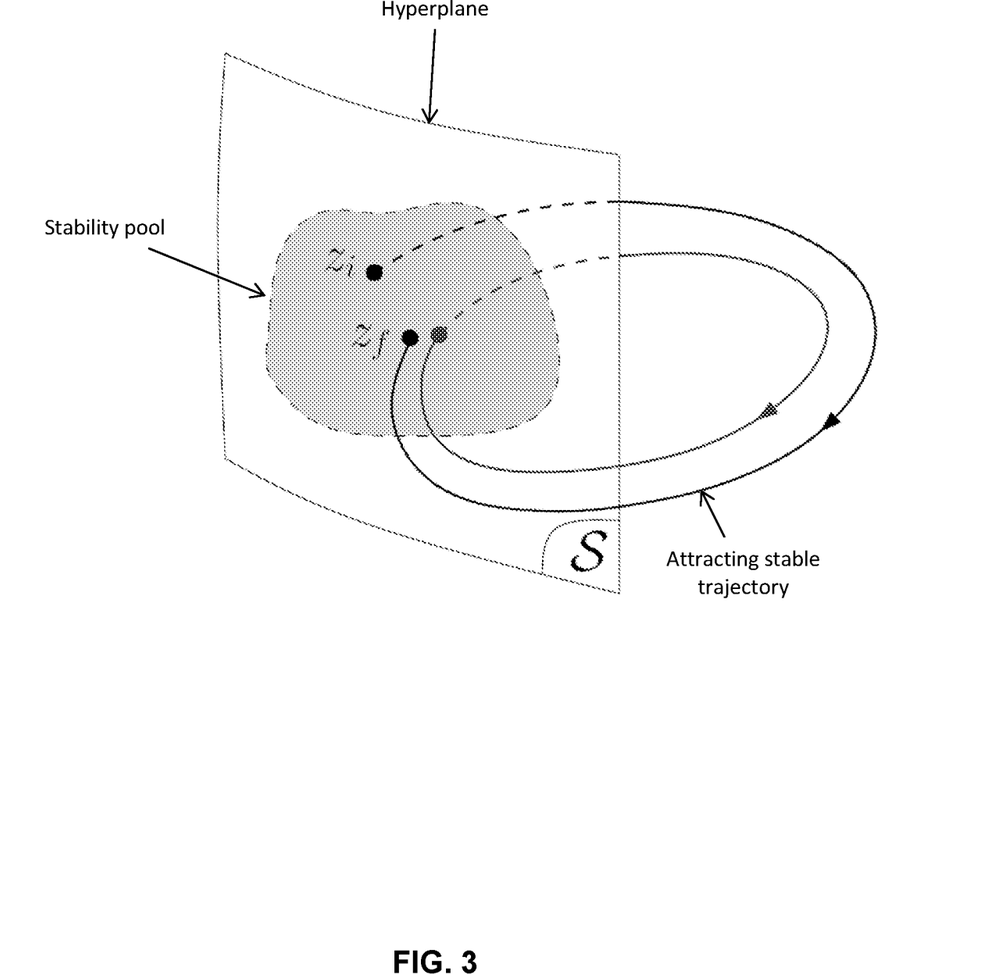
FIG. 3 schematically represents the variety of the hybrid zero dynamics and the attraction pool of a cyclic trajectory.

More visually, and as illustrated in FIG. 3, for a given set of virtual requirements, the "requirement" state space is a topological variety of the hybrid zero dynamics in which each point is defined by a vector of the values of the non-actuated degrees of freedom and the value of the phase parameter (and possibly their derivatives). It is understood that this variety is not necessarily with the dimension 3 as is the case in FIG. 3, it is only an example facilitating the understanding of the phenomenon and it will be defined that the variety is with a dimension n.

Each value of the phase parameter defines a hyperplane (with the dimension n−1) of the variety containing all the n−1-tuples of possible values of the non-actuated degrees of freedom for this value of the phase parameter.

One of these hyperplanes, represented in FIG. 3, is the ensemble $\mathcal{S}$ called the "switching surface", which corresponds to the boundary between two cycles, i.e. the point where the phase variable comes from the final value back to the initial value: during a step, there is first a state of $\mathcal{S}$, the dynamics is applied as $x \notin \mathcal{S}$ by forming an orbit until coming back to a point of $\mathcal{S}$.

Thus, a "continuous with a dimension n" system switches to a "discrete with a dimension n−1" system on a cycle basis.

If the start point and end point are the same ("fixed point"), a periodic orbit is obtained in the variety of the hybrid zero dynamics as represented by FIG. 3.

For a periodic orbit to be called an attractive orbit, it is further necessary that starting from a point distinct from the fixed point, at the next iteration the fixed point is closer (in opposition to instable periodic orbits in which it is away as soon as the fixed point is even a little farther).

An attraction pool can thus be defined, that is a subspace of $\mathcal{S}$ comprising all said points distinct from the fixed point moving closer at the next iteration to the fixed point, i.e. in which any trajectory starting in this pool moves closer and closer to the attracting periodic orbit after each walking cycle (trajectory $Z_i \rightarrow Z_f$). More precisely, the system converges for a start point in the pool, and diverges for a start point off the pool (that is finally falls down).

It is thereby possible to designate an HZD type controller (it will be later seen how to do it) which forces the system to fulfil the virtual requirements and maximises the attracting character of the cycle for the underactuated degrees of freedom. It first makes it possible to ensure that the exoskeleton 1 will for example be actually capable of bringing its foot swinging forwardly and of landing on the ground neither too early not too late in spite of the underactuated character. Furthermore, even in the presence of disturbances, as long as the system state remains in the attraction pool, the underactuated degrees of freedom naturally converge to the periodic orbit and the system comes back to an expected walking cycle after a few steps and the walking speed is thus ensured.

On the other hand, this concept enables both phases during which the pressing foot is in contact with the ground, rotating about the forefoot or during the phase of ground landing and rotation about the back of the foot to be managed. Every time, it is possible to find virtual requirements for the actuated degrees of freedom which generates a Hybrid Zero Dynamics for the other degrees of freedom in which an attracting cycle exists.

As many sets of requirements as necessary can be generated, each corresponding to step lengths, walking speeds and different directions.

Method

If the notion of HZD type controller is already known and enables stable trajectories to be generated, the later are up to now cyclic and with a non-zero initial speed. This notion is thus inapplicable to systems starting from a stop, and a fortiori in a non-exactly reproducible way (because of the presence of the human operator) that are exoskeletons.

The present method for moving an exoskeleton 1 smartly resolves these difficulties by providing a means to be placed inside an attraction pool.

Figure 4:
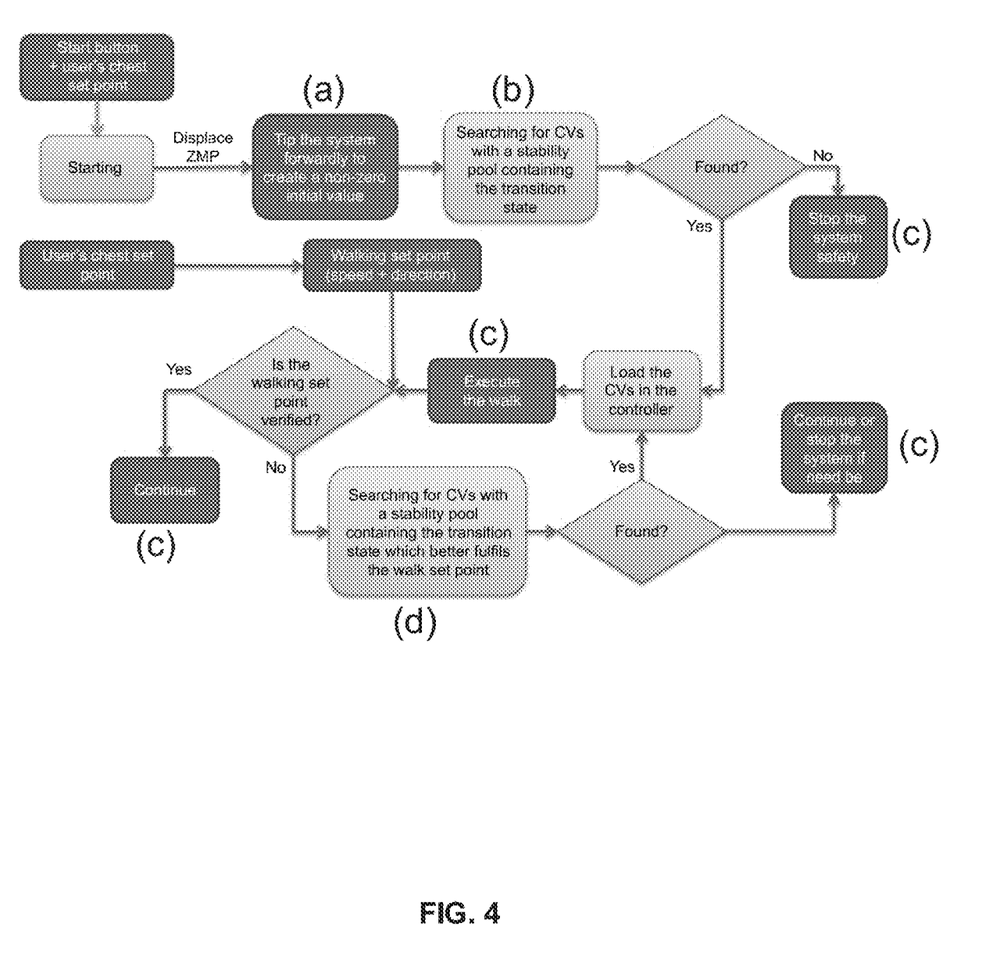
FIG. 4 is a diagram illustrating a preferred embodiment of the method according to the invention.

In practice, and as illustrated by FIG. 4, the present method begins by a step (a) of putting the exoskeleton 1 in a tipping state. More precisely, when a start request is received, the data processing means generate and emit a command to at least one of said actuators so as to place deliberately the exoskeleton 1 in this tipping state.

By tipping state, it is advantageously meant a state in which a Zero Moment Point (ZMP) is not inside a lift surface for the exoskeleton 1. The ZMP more precisely designates the point where the moment of the contact forces has two of its three coordinates which are zero (i.e. is purely vertical).

Thus, the tipping preferentially corresponds to a desired displacement of the ZMP so as to "bring" the ZMP out of the lift surface, via a starting algorithm. Thus, it is a "falling" situation which was until now always avoided at any price. This starting algorithm can be based on precalculated time parameterised movements tested upstream or on sensor referenced movements, for example means for detecting the impact of the feet on the ground 13 and/or inertial measurement means 14 equipped on the exoskeleton 1.

Before this, step (a) advantageously comprises determining a walking speed and/or direction set point as a function of which said command to at least one of said actuators is generated.

Indeed, if the exoskeleton 1 is an exoskeleton receiving a human operator, it is the posture of said human operator which determines the walking speed and/or direction set point (unlike a normal robot which can directly receive a state request comprising a walking speed and/or direction set point).

To that end, the operator can be provided with a jacket of sensors 10 enabling his/her chest configuration (orientation thereof) to be detected. The direction in which the operator orients his/her chest is that in which he/she desires to walk and the speed is given by the intensity with which he/she puts his/her chest forwardly (at which point he/she leans). The start request can correspond to the operator depressing a button (or a particular posture) meaning his/her intention to walk and thus commanding the data processing means to determine the direction and/or speed set point.

In a main step (b), a set of virtual requirements is identified such that said tipping state is included in the stability pool associated with this set of virtual requirements in a database.

Indeed, the present method provides the use of a database (called a control library) stored in data storage means 12 (a memory connected to the data processing means 11 of triplets of:

a set of virtual requirements on said actuated degrees of freedom, the virtual requirements being parameterised by a phase variable (to which an attracting cycle for the underactuated degrees of freedom corresponds, thus defining a full trajectory for the system), a controller (HZD) for said exoskeleton 1 capable of generating commands of said actuators so as to fulfil said virtual requirements by implementing at least one attracting stable trajectory in said topological variety formed by all the n-tuples of the possible values of said non-actuated degrees of freedom and the phase variable, a stability pool formed by all the points of the hyperplane $S$ of said variety for a given value of the phase parameter, from which the execution of said controller allows a convergence to said attracting stable trajectory (i.e. an absence of divergence).

The different sets of virtual requirements typically correspond as explained to different step lengths, walking speeds, and different directions, various gaits, etc. Those skilled in the art are able to generate them.

For each HZD controller, it has been possible to check in simulation or even in practice that it makes the associated trajectory stable, i.e. it enabled even in the presence of disturbances to be quickly brought back to this trajectory even for the underactuated degrees of freedom.

It will be understood that the stability pools can also be determined by simulation (for each point of $S$, it is tested whether the system diverges or converges, and all the points such that it converges are identified).

This solution turns out to be particularly efficient, because the entire complexity of the dynamic walking is made upstream. In use, the exoskeleton has only to search in the control library for a set of requirements defining a full trajectory for the system and stable in the current tipping state, and it is ensured that the HZD controller will be able to make a safe walking in spite of possible disturbances.

If no acceptable set of virtual requirements is identified (i.e. for each set of virtual requirements, the tipping state is off the stability pool), in a step (c), stopping the exoskeleton is commanded to ensure the operator's security.

If an acceptable set of virtual requirements is identified, step (c) sees the execution of the controller associated with the set of virtual requirements identified such that the exoskeleton 1 walks, i.e. makes at least one cycle (one step).

If a walking speed and/or direction set point has been determined, step (c) then advantageously comprises checking beforehand that said speed and/or direction set point is fulfilled by the current walk in said database, i.e. that an error between the current walk speed and/or direction and said speed and/or direction set point is lower than a predetermined threshold.

Indeed, it is necessary that the identified set of requirements not only allows a stable trajectory, but also that it is in accordance with the operator's set points.

If said speed and/or direction set point is fulfilled by the current walk (i.e. the error is below the threshold), it is continued.

On the contrary, if the speed and/or direction set point is not fulfilled by the current walk (i.e. the error becomes too large), the method advantageously comprises a step (d) of identifying in said database a new set of virtual requirements such that the current state of the exoskeleton 1 is included in said stability pool associated with this set of virtual requirements; and repeating step (c), i.e. loading and executing a new HZD controller.

The successive steps (c) and (d) can thereby be repeated as a loop, because the speed and/or direction set points can vary at any instant if the operator desires it: if the set points change, the current set can be unsuitable and require to identify a new set of requirements in the database.

It is to be noted that at each repetition of step (c), it can include stopping the exoskeleton 1 if no acceptable set of virtual requirements is identified.

Equipment and System

According to a second aspect, the invention relates to the exoskeleton 1, in particular of the exoskeleton type, for the implementation of the method according to the first aspect.

As explained, the exoskeleton 1 comprises data processing means 11 and data storage means 12 (being possibly external), and if necessary inertial measurement means 14 (inertial unit) and/or means for detecting the impact of the feet on the ground 13 (contact sensors or possibly pressure sensors).

It has a plurality of degrees of freedom including at least one degree of freedom actuated by an actuator controlled by the data processing means 11 and at least one non-actuated degree of freedom.

The data storage means 12 store a database of triplets consisting of:
- a set of virtual requirements on said actuated degrees of freedom, the virtual requirements being parameterised by a phase variable,
- a controller for said exoskeleton 1 capable of generating commands of said actuators so as to fulfil said virtual requirements by implementing at least one attracting stable trajectory in a topological variety formed by all the n-tuples of the possible values of said non-actuated degrees of freedom and the phase variable,
- a stability pool formed by all the points of a hyperplane of said variety for a given value of the phase parameter, from which the execution of said controller allows a convergence to said attracting stable trajectory.

And the data processing means 11 are configured to implement:
- a module of generating and emitting a command to at least one of said actuators so as to put the exoskeleton 1 in a tipping state when a start request is received (and optionally determining a speed and/or direction set point);
- a module of identifying in said database storage means 12 a set of virtual requirements such that said tipping state is included in said stability pool associated with this set of virtual requirements (and such that said speed and/or direction set point is fulfilled);
- an execution module of the controller associated with the identified set of virtual requirements such that the exoskeleton 1 walks (or stopping the exoskeleton 1 if no acceptable set of virtual requirements is determined).

Computer Program Product

According to a third and a fourth aspect, the invention relates to a computer program product comprising code instructions for the execution (on the processing means 11) of a method for moving an exoskeleton 1 according to the first aspect of the storage means (for example the data storage means 12) on which this computer program product is located.

The invention claimed is:

1. A method for moving an exoskeleton receiving a human operator, said exoskeleton having a plurality of degrees of freedom including at least one actuated degree of freedom actuated by an actuator controlled by a data processor and at least one non-actuated degree of freedom, the method comprising executing by the data processor the steps of:
    (a) when a start request is received, generating and emitting a command to said actuator so as to put the exoskeleton in a tipping state;
    (b) in a database stored in a data storage unit of triplets of:
        a set of virtual constraints on each actuated degree of freedom, the virtual constraints being parameterised by a phase variable,
        a controller for said exoskeleton generating commands of said actuator so as to fulfill the virtual constraints by implementing at least one attracting stable trajectory in a topological manifold formed by all n-tuples of the possible values for each non-actuated degree of freedom and the phase variable,
        a stability pool formed by all the points of a hyperplane of said topological manifold for a given value of the phase variable, from which the execution of said generated commands of said controller allows a convergence to said attracting stable trajectory;
        identifying a set of virtual constraints such that said tipping state is included in said stability pool associated with said set of virtual constraints;
    (c) executing said generated commands of the controller associated with the set of virtual constraints identified such that the exoskeleton walks.

2. The method according to claim 1, wherein step (a) comprises determining a walking speed and/or direction set point as a function of which said command to said actuator is generated, step (c) comprising checking that said walking speed and/or direction set point is fulfilled by a current walk in said database.

3. The method according to claim 2, comprising, if said walking speed and/or direction set point is not fulfilled by the current walk, a step (d) of identifying in said database a new set of virtual constraints such that the current state of the exoskeleton is included in said stability pool associated with said new set of virtual constraints; and repeating step (c).

4. The method according to claim 2, wherein said walking speed and/or direction set point is determined as a function of a posture of said human operator.

5. The method according to claim 4, wherein the operator's chest is equipped with a plurality of posture sensors, said walking speed and/or direction set point being determined as a function of the posture of said operator's chest measured by the plurality of sensors.

6. The method according to claim 1, wherein the tipping state is a state in which a Zero Moment Point, ZMP, is not inside a lift surface for the exoskeleton.

7. The method according to claim 1, wherein step (c) comprises stopping the exoskeleton if no acceptable set of virtual constraints is identified.

8. An exoskeleton for receiving a human operator, comprising a data processor and having a plurality of degrees of freedom including at least one actuated degree of freedom actuated by an actuator controlled by the data processor and at least one non-actuated degree of freedom, wherein it comprises a data storage unit storing a database of triplets of:
    a set of virtual constraints on each actuated degree of freedom, the virtual constraints being parameterised by a phase variable,
    a controller for said exoskeleton generating commands of said actuator so as to fulfill said virtual constraints by implementing at least one attracting stable trajectory in a topological manifold formed by all the n-tuples of the possible values of each non-actuated degree of freedom and the phase variable, a stability pool formed by all the points of a hyperplane of said topological manifold by a given value of the phase variable, from which the execution of said generated commands of said controller allows a convergence to said attracting stable trajectory;

and in that the data processor is configured to implement:

a module for generating and emitting a command to said actuator so as to put the exoskeleton in a tipping state when a start request is received;

a module for identifying in said database of the storage unit a set of virtual constraints such that said tipping state is included in said stability pool associated with this set of virtual constraints;

an execution module of the controller associated with the set of virtual constraints identified such that the exoskeleton walks.

9. A non-transitory storage means on which a computer program product comprises code instructions for the execution of a method according to claim 1 for moving the exoskeleton.

\* \* \* \* \*